J. B. GODWIN.
Cotton Seed and Corn Planter.

No. 101,257.

2 Sheets—Sheet 1.

Patented May 29, 1870.

Witnesses

Inventor
J. B. Godwin

J. B. GODWIN.

Cotton Seed and Corn Planter.

No. 101,257.

2 Sheets—Sheet 2.

Patented May 29, 1870.

United States Patent Office.

JOSHUA B. GODWIN, OF WILLIAMSTON, NORTH CAROLINA.

Letters Patent No. 101,257, dated March 29, 1870.

IMPROVEMENT IN COTTON-SEED AND CORN-PLANTERS.

The Schedule referred to in these Letters Patent and making part of the same.

*To all whom it may concern:*

Be it known that I, JOSHUA B. GODWIN, of Williamston, in the county of Martin and State of North Carolina, have invented a new and useful Improvement in Cotton-seed and Corn-Planter; and I do hereby declare that the following is a full, clear, and exact description thereof, which will enable others skilled in the art to make and use the same, reference being had to the accompanying drawings forming part of this specification, in which—

Figure 1:
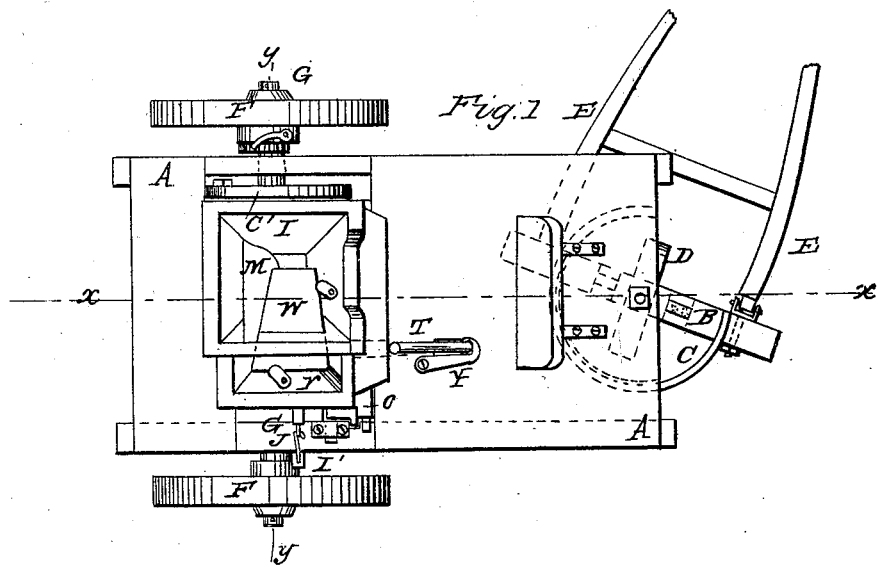

Figure 1, Sheet I, is a top view of my improved machine.

Figure 2:
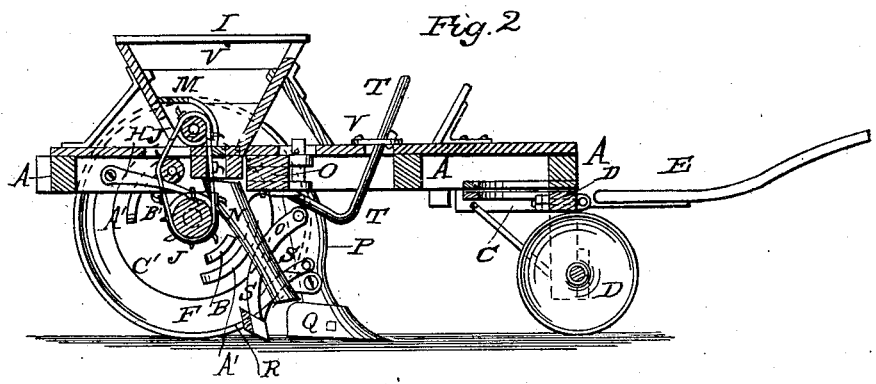

Figure 2, Sheet I, is a vertical longitudinal section of the same, taken through the line x x, fig. 1.

Figure 3:
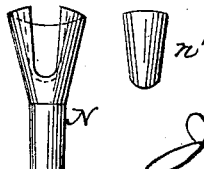

Figure 3, Sheet I, are detail views of parts of the conductor-spout.

Figure 4:
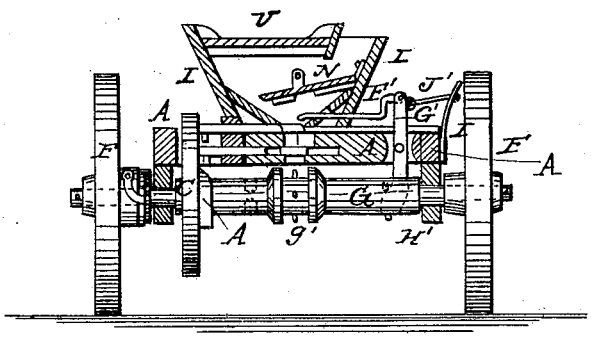

Figure 4, sheet II, is a vertical cross-section of the same, taken through the line y y, fig. 1.

Figure 5:
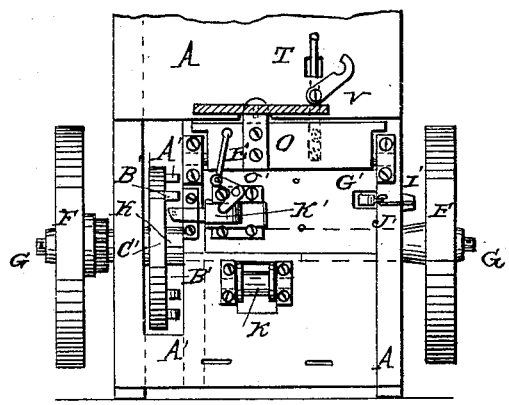

Figure 5, Sheet II, is a detail top view of the same, the hopper being removed.

Similar letters of reference indicate corresponding parts.

My invention has for its object to furnish a simple, convenient, effective, and accurate machine for planting cotton-seed and corn, which shall be so constructed and arranged that it may be easily adjusted for work in either capacity; and It consists in the construction and combination of various parts of the machine, as hereinafter more fully described.

A represents the frame or platform of the machine, the forward end of which is connected by a king-bolt to the cross-beam B, to which the fifth wheel C is attached, and to which are also attached downwardly-projecting standards having a small wheel, D, pivoted to their lower ends to support the forward end of the machine.

E are the thills or tongue, the cross-bar of which is connected with the cross-beam B by eye-bolts or clips in the ordinary manner. The rear parts of the thills or tongue E are bent or curved downward, as shown in fig. 2, to adapt them to pass beneath the front part of the frame A, as shown in figs. 1 and 2, so that the machine may be turned around in a small space.

F are the drive-wheels, which work upon the journals of the axle G, and one or both of which are connected with said axle G by a pawl and ratchet-wheel, as shown in figs. 1, 4, and 5, so that when the machine is drawn forward the said wheels F will carry the said axle G with them in their revolution, but when the machine is backed the said wheels may revolve without revolving the said axle.

The axle G may be secured against being revolved backward by the friction of the said pawl and ratchet-wheel by a pawl, H, pivoted to the rear part of the frame A, and which takes hold of teeth or notches formed upon the said axle G, as shown in fig. 2.

I is the seed-hopper, which is securely attached to the frame or platform A, directly over or a little in front of the axle G.

J is an endless band or belt, which passes around a toothed wheel, g', formed upon or attached to the middle part of the axle G, so that the said axle may carry the said belt with it in its revolution. The belt J has teeth attached to it, which take hold of the cotton-seed in the hopper I and draw it out of said hopper.

The toothed belt J passes around a guide-pulley, K, pivoted to the frame A a little in the rear of the hopper I, and around a pulley, L, pivoted in the rear lower part of the hopper I.

M is a cap attached to the rear side of the hopper I, and which covers the roller or pulley L, and prevents the cotton-seed from coming in contact with said roller.

The forward side of the cap M is slotted to allow the teeth of the belt J to project while passing down the forward side of the roller or pulley L to take hold of the cotton-seed and carry it through the opening in the bottom of the said hopper and into the upper end of the spout N, by which it is conducted to the ground. The rear side of the upper end of the conductor-spout N is notched, as shown in fig. 3, to allow the toothed belt J to carry the cotton-seed well into the said spout.

When the machine is used for planting corn, the notch in the upper part of the spout N is closed by a small slide, n', as shown in fig. 3.

The spout N is rigidly attached to the pivoted cross-bar O, and the standard P of the plow Q that opens the furrow to receive the seed, so as to introduce the seed into the bottom of the furrow close in the rear of the plow Q. The ends of the cross-bar O work in bearings in the frame A, and to it is securely attached the upper end of the standard P.

R is the covering-plate, which is attached to the lower ends of the arms S, the other ends of which are adjustably attached to the standard P, so that the cover may be adjusted according to the depth at which it is required to have the seed covered in the soil.

T is a bent lever, the lower end of which is securely and rigidly attached to the cross-beam O, and the upper end of which extends up through a slot in the platform or frame A in such a position that it may be conveniently reached and operated by the driver from his seat U, so that, by operating the lever T, the furrowing-plow, conductor-spout, and coverer may all be raised from the ground at the same time and by the same operation.

V is a catch pivoted to the frame of platform A, in such position as to take hold of the lever T and hold the furrowing-plow and its attachments away from the ground. The driver's seat U rests upon cleats attached to the upper part of the hopper I, so as to serve at the same time as a cover for said hopper. One end of the hopper I is left uncovered by the seat U for convenience in putting in the seed.

When the machine is to be used for planting corn, the inclined apron or platform W is placed in the lower part of the hopper I to relieve the dropping slides from the weight of the corn in the said hopper, the space being left at the lower end of the said apron W for the corn to feed itself down to the said dropping slides.

The dropping slides X Y are placed one above the other, and at such a distance apart that the space between them may contain enough seed for a hill. The size of this space may be adjusted at will by a small block of gutta-percha, or other suitable material, placed in it between the said slides, as shown in fig. 4.

The slides X and Y work in recesses in the frame A, and their outer ends project at the side of said frame in such positions as to be operated upon by the cams A' and B', detachably attached to the wheel C¹, which is attached to the axle G. The cam A', that operates the upper slide X, is made longer than the cam B', that operates the lower slide Y.

The slides X and Y, when relieved from the cams A' B', are forced outward into the position shown in fig. 4, and held there by the springs K¹, attached to the frame A, and which press against pins attached to the said slides, as shown in figs. 4 and 5.

As the machine is drawn forward, the longer cam A' strikes against the upper slide X and pushes it inward, shutting off the corn in the space between the slides from that in the hopper. As the slide X is closed, the slide Y is pushed forward by the cam B', to allow the corn to drop through the hole in said slide into the conductor-spout N, by which it is conducted to the ground. As the slide Y is released from the short cam B' and is forced outward by its spring K' to close the discharge-opening, the upper slide X is released from the longer cam A', and is forced outward by its spring K' to admit the corn for another hill.

D' is a small bent lever, pivoted to the frame A in such a position that one of its arms may lie upon the upper side of the upper slide X, and rest against a short pin attached to said slide.

The end of the other arm of the lever D' is connected with the pivoted cross-bar or beam O by a pitman, E', as shown in fig. 5, so that when the furrowing-plow, conductor-spout, and coverer are raised from the ground, the operation of raising them may force the said slide X forward to prevent the escape of the corn.

F' is the stirrer, which is used when planting corn to keep the corn stirred up and prevent its clogging above the discharge-orifice. The stirrer F' passes in through the end of the hopper I, and its outer end is pivoted to the upper end of the lever G', which is pivoted to the frame A in such a position that its lower end, which has a cam formed on it, may be operated upon by pins H' attached to the axle G, as shown in fig. 4, so that the stirrer may be operated by the advance of the machine.

The lever G' is drawn back when released from the pins H' by the spring I', which is attached to the frame A, and the free end of which is connected with the said lever by a short pitman, J', as shown in figs. 4 and 5.

Having thus described by invention,

I claim as new and desire to secure by Letters Patent—

1. The combination of the toothed wheel or pulley g', guide-pulleys K and L, and toothed belt J, with the axle G, frame A, hopper I, notched conductor-spout N, furrowing-plow P Q, and coverer R S, substantially as herein shown and described, and for the purpose set forth.

2. The combination of the pivoted cross-beam O, plow-standard P, conductor-spout N, coverer R S, and lever T, with each other and with the frame A, hopper I, and a seed-dropping device, substantially as herein shown and described, and for the purpose set forth.

3. The combination of the slides X and Y, springs K', detachable cams A' B', and wheel C', with the hopper I, frame A, and axle G, substantially as herein shown and described, and for the purpose set forth.

4. The combination of the bent lever D' and pitman E' with the slide X and pivoted beam O, to which the furrowing-plow, conductor-spout, and coverer are attached, substantially as herein shown and described, and for the purpose set forth.

5. The combination of the stirrer F¹, pivoted lever G', pins H', and springs I', with the hopper I, frame A, and axle G, substantially as herein shown and described, and for the purpose set forth.

The above specification of my invention signed by me this 2d day of December, 1869.

J. B. GODWIN.

Witnesses:
GEO. W. MABEE,
JAMES T. GRAHAM.